July 12, 1960 R. E. MOREN 2,945,177
CIRCUIT FOR ADJUSTING SYMMETRICAL BAND-PASS SYSTEMS
Filed Aug. 27, 1956 2 Sheets-Sheet 2
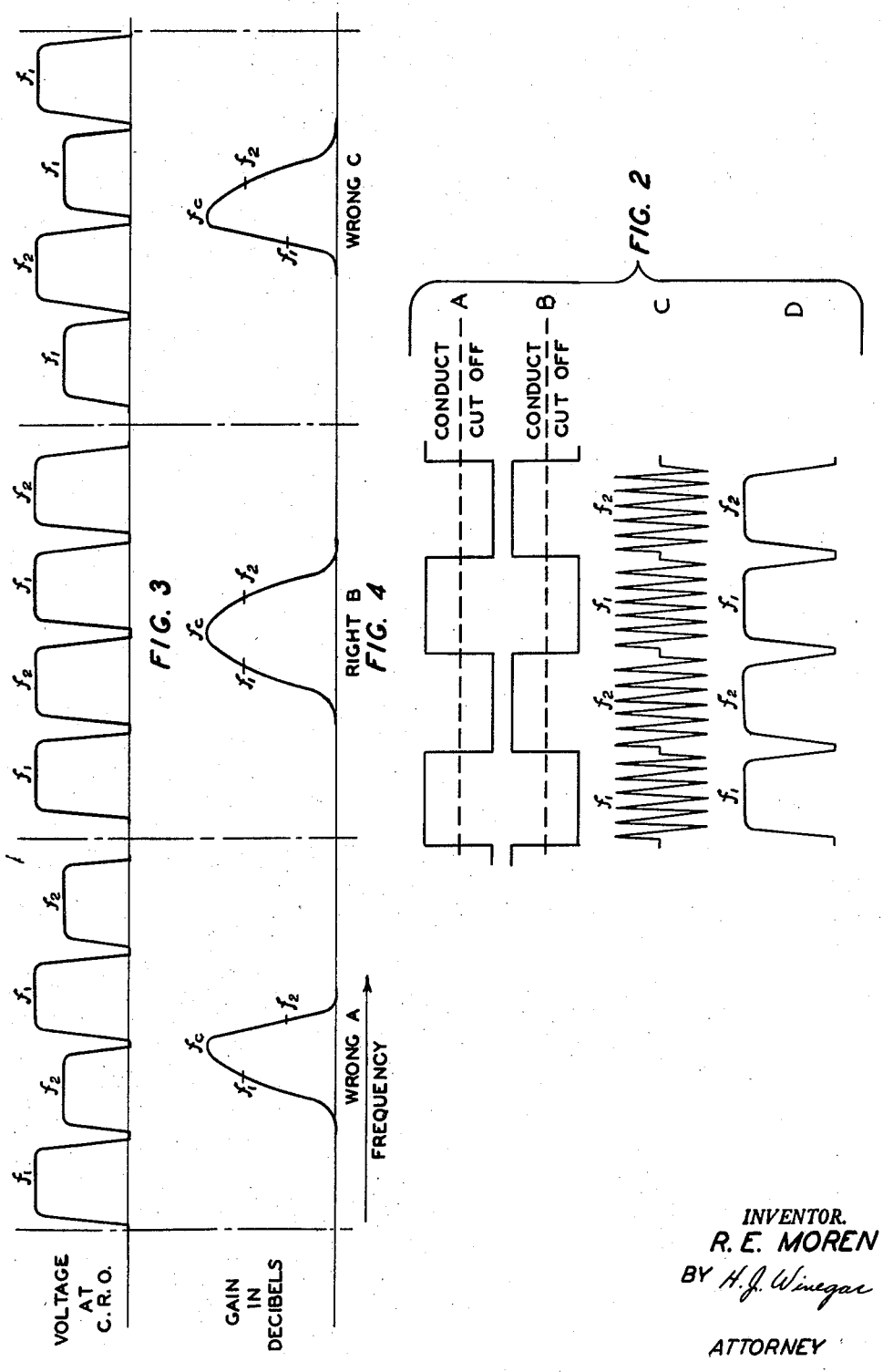
INVENTOR.
R. E. MOREN
BY H. J. Winegar
ATTORNEY United States Patent Office 2,945,177
Patented July 12, 1960

2,945,177

CIRCUIT FOR ADJUSTING SYMMETRICAL BAND-PASS SYSTEMS

Robert E. Moren, Graham, N.C., assignor to Western Electric Company, Incorporated, New York, N.Y., a corporation of New York Filed Aug. 27, 1956, Ser. No. 606,362

1 Claim. (Cl. 324—57)

The present invention relates to methods of and apparatus for testing and adjusting electrical equipment, particularly, of the type utilizing a symmetrical band-pass system.

An object of the present invention is to provide methods and apparatus which simplify and expedite the testing of the gain versus frequency characteristic of a unit employing a band-pass system, such as an intermediate frequency amplifier.

A feature of the invention lies in methods of and apparatus for testing a unit of the band-pass type for symmetry of response at two distinct frequencies equally displaced on opposite sides of the central frequency in the operating band of the unit.

An advantage of the present testing methods and apparatus resides in its adaptability for use in testing other gain versus frequency characteristics of a unit having a band-pass system in addition to its response at two separated points in the operating band.

It is the usual practice in testing amplifier units of the type mentioned to obtain a response curve over a band of frequencies by employing a signal source which is swept over the operating frequency of the unit, the output being detected and displayed on a cathode-ray oscilloscope. This system requires that the oscilloscope include precisely positioned markers in addition to requiring frequent gain measurements to insure accurate calibration of the oscilloscope. It is particularly difficult to arrange well-defined markers on the oscilloscope for readings at the lower radio frequencies. According to the present invention the aforesaid disadvantages are eliminated, since the symmetry of response may be determined by use of an oscilloscope without markers.

A clear understanding of the invention may be obtained by a reading of the ensuing description in conjunction with the drawings wherein:

Figs. 2 and 3 illustrate wave shapes appearing at different points of the system during the testing procedure, and Fig. 4 illustrates the gain versus frequency characteristic of a unit under test.

Figure 1:
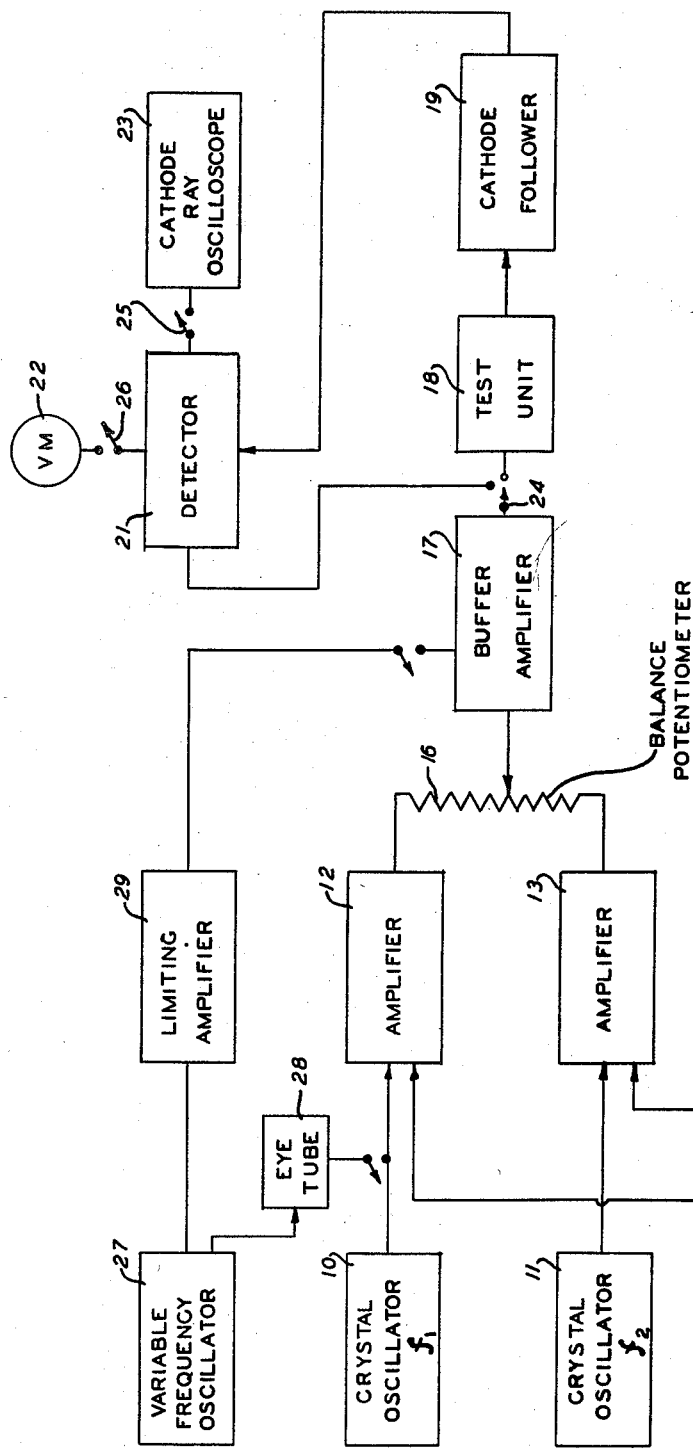
Fig. 1 is a schematic diagram of an illustrative system embodying the invention.

As illustrated in Fig. 1, an apparatus embodying the present invention includes a pair of crystal controlled oscillators 10 and 11, each of which may comprise a number of crystals designed to operate at different frequencies in the operating range of the units to be tested. During a given test one crystal oscillator 10 provides a frequency $f_1$ displaced from the central frequency $f_c$ of the unit under test, while the other crystal oscillator 11 provides a frequency $f_2$ equally displaced but at the opposite side of the central frequency. While crystal oscillators are specified, other sharply tuned and stable oscillators may be substituted therefor.

The outputs of the respective oscillators 10 and 11 are fed to amplifiers 12 and 13, which are alternately cut-off and rendered conducting by means of a square wave generator 14. The square wave outputs of the generator 14 are shown in the upper two curves of Fig. 2, the outputs being simultaneously fed to the respective amplifiers. By this arrangement it can be seen that while one amplifier is rendered conducting, the other amplifier is cutoff, at such time there being a positive pulse applied to the grid of one amplifier while a negative pulse is applied to the grid of the other amplifier. As a result, there appears at a balance potentiometer 16, suitably connected to an operating voltage source, a wave shape as depicted by the curve C of Fig. 2. In other words, a train of signals representative, alternately, of frequencies $f_1$ and $f_2$, respectively, below and above the central frequency appears across the potentiometer 16.

The signals appearing at the potentiometer 16 are in turn passed through a buffer amplifier 17, through the unit 18 under test to a cathode follower 19, used for impedance matching purposes, to a detector 21 whose output may be connected to a voltmeter 22, preferably a vacuum tube voltmeter, or to a cathode-ray oscilloscope 23 requiring no special markers. The detector 21 produces at its output the envelope of the combined alternate signals of frequencies $f_1$ and $f_2$, as shown by curve D in Fig. 2.

Prior to making a test for symmetry, it is desirable to check the signal appearing across the balance potentiometer 16 at the outputs of the amplifiers 12 and 13, to determine whether the alternate frequencies $f_1$ and $f_2$ are of equal amplitude. For this purpose the test unit 18 is bypassed by moving a switch 24 to its upper position while switch 26 is moved to its closed position. The rectified envelope from the detector 21 is now displayed on the oscilloscope 23, while the balance potentiometer 16 is set to a position whereat the rectified envelope indicates equal signals at the frequencies $f_1$ and $f_2$, as shown by the curve B of Fig. 3.

Assume, for example, that it is desired to test an intermediary frequency amplifier, which is designed for a center frequency of 4.3 mc. and is required to have a maximum gain of a predetermined magnitude at the center frequency and a response curve such that the output frequencies 30 kc. on each side of 4.3 mc. are a certain number of decibels down in gain from the maximum gain, and more particularly, for the test being considered, that the gain be equal at such points on the curve. With such requirements the crystal oscillators 10 and 11 provide, respectively, frequencies $f_1$ and $f_2$ of 4270 kc. and 4330 kc. After the balance potentiometer 16 has been adjusted as described above, switches 24 and 25 are moved to their lower positions. The oscilloscope is now read and, if the conditions of non-symmetry illustrated by curves A and C of Fig. 3 prevail, the unit 18 under test is adjusted until the response is symmetrical, as indicated by curve B of Fig. 3. The invention thus provides a quick and accurate indication of a non-symmetrical response of a unit under test so that the latter may be adjusted readily to rectify such condition. In some instances it may be desirable to test units in the manner described at two or more points asymmetrically related in the operating band.

If further and more elaborate tests of frequency versus gain characteristics and adjustments of a unit are required, the system includes, as shown in Fig. 1, a variable frequency oscillator 27, and an eye tube 28 for checking the accuracy of this oscillator against one of the crystal oscillators 10 and 11, for example, the oscillator 10, as shown in Fig. 1. The variable frequency oscillator output is passed to a limiting amplifier 29, which assures an output of uniform magnitude for application to the buffer amplifier 17. The variable frequency oscillator 27 is set to the center frequency 4.3 m.c., which may be shown by a reading on either the voltmeter 22 or the cathode-ray oscilloscope 23. Based on such readings, the unit under test may be adjusted until the desired maximum response is attained. It is, of course, to be understood that suitable switches and control knobs may be provided in the testing equipment to facilitate the testing and adjusting procedures.

In the chosen example of an amplifier to be tested, the response curve characteristic illustrated in Fig. 4 may be checked by simply tuning the variable frequency oscillator from 4.3 mc., to 4.33 mc., noting the level change on the voltmeter 22, and then tuning the variable frequency oscillator (from 4.3 mc.) to 4.27 mc., noting the level changes on the voltmeter which, of course, may be calibrated to provide a direct reading in decibels. It is only necessary to occasionally make a check, and adjustment, if necessary, of the voltmeter 22 to assure that accurate readings are being obtained. In carrying out the tests for maximum responses at the central frequency, and in determining the response curve, it is possible to use instead of variable frequency oscillators, the crystal oscillators 10 and 11, since each may include several crystals operating at different frequencies, as mentioned in an earlier part of specification.

It is to be understood that the above-described arrangements are illustrative of the invention. Other arrangements may be devised by those skilled in the art without departing from the spirit and scope of the invention.

What is claimed is:

A testing apparatus for visually indicating on an oscilloscope the frequency response characteristics of an amplifier unit designed to operate about a central frequency, which comprises two oscillators for applying input signals, one of the oscillators being stable and sharply tuned at a frequency that is a predetermined number of cycles below the central frequency, and the other oscillator being stable and sharply tuned at a frequency that is said predetermined number of cycles above the central frequency, two amplifiers, means for applying said input signals to said two amplifiers, a square wave generator connected to each of the amplifiers for alternately rendering the amplifiers conductive and non-conductive, one of the amplifiers being in the conductive condition when the other amplifier is in the non-conductive condition, a balance potentiometer including two terminals, one of the potentiometer terminals connected to an output terminal of one of the amplifiers and the other potentiometer terminal connected to an output terminal of the other amplifier, a detecting circuit coupled to the output of the amplifier unit to be tested for observing simultaneously the response of the amplifier unit to the two signals from the oscillators, said detecting circuit including a detector and the oscilloscope, and an adjustable tapping point on the potentiometer coupled to the input of the amplifier unit for simultaneously adjusting the relative magnitudes of the outputs of the amplifiers to simultaneously vary said outputs until they obtain an initial condition displayed on the oscilloscope by a series of visual flattop envelopes of equal shapes and magnitudes, the tops of said envelopes defining a straight line, said envelopes remaining in the initial condition if the amplifier unit responds equally with respect to both of said frequency signals and if said amplifier unit does not respond equally with respect to both of said frequency signals, said tops of adjacent envelopes varying in height to define on the oscilloscope a series of broken, staggered lines.

References Cited in the file of this patent

UNITED STATES PATENTS

| | | |
|---|---|---|
| 2,573,402 | Chapman | Oct. 30, 1951 |
| 2,684,467 | Young et al. | July 20, 1954 |
| 2,733,433 | Morrison | Jan. 31, 1956 |
| 2,794,952 | Golden et al. | June 4, 1957 |
| 2,813,157 | Dobra | Nov. 12, 1957 |

OTHER REFERENCES

Ring: "Meas. of Delay Detortion in Microwave Repeaters," Bell System Tech. Journal, vol. 27, April 1948, pp. 247–264.